Aug. 2, 1960     K. DREYER ET AL     2,947,500

ROCKET POWER PLANTS FOR AIRCRAFT AND THE LIKE

Filed April 5, 1957

INVENTORS:
KUNO DREYER
WILHELM HESSEL
By LUDWIG BÖLKOW

Leon M. Strauss
AGT.

United States Patent Office 2,947,500
Patented Aug. 2, 1960

2,947,500

ROCKET POWER PLANTS FOR AIRCRAFT AND THE LIKE

Kuno Dreyer, Echterdingen, Wilhelm Wessel, Stuttgart-Hohenheim, and Ludwig Bölkow, Stuttgart-Degerloch, Germany, assignors to Bölkow-Entwicklungen KG., Stuttgart-Flughafen, Germany Filed Apr. 5, 1957, Ser. No. 651,061

Claims priority, application Germany Apr. 6, 1956

2 Claims. (Cl. 244—23)

This invention relates to rocket power plants for aircraft, missiles and automotive vehicles.

The layout of the power plant in rocket driven planes is carried out in a manner, in which two quite different strains produced by thrust at the drive means are to be taken into consideration. A relatively great thrust of short duration becomes necessary for starting and for acceleration to attain the desired speed of the plane and a relatively smaller thrust of extended or prolonged duration is required to maintain the plane at the desired speed during the course of the flight.

Both these thrust requirements are absolutely different from each other and consequently cannot be carried out by one and the same rocket drive plant, in particular, when same is supplied with solid fuel. It is, therefore, conventional to provide separate thrust or power plants, namely, a starting and acceleration drive plant and a continuous cruising or flight drive plant. The directions of thrust in both these plants are, as will be further explained, very often different from each other.

The present invention is more particularly concerned with the disposition of the occupying space of both thrust plants in respect to each other and relative to the aircraft.

Various space arrangements have been employed heretofore. In some instances the flight thrust plant has been disposed symmetrically to the axis of the plane fuselage, while the starting and acceleration drive plants have often been arranged outside the fuselage preferably laterally thereof, underneath or even behind the continuous thrust plant.

While the thrust nozzle of the continuous drive plant is aligned with the center of resistance of the fuselage, the thrust of the starting or acceleration plant is usually directed through the center of gravity of the fuselage. For that reason, canted nozzles have been employed in acceleration plants. When acceleration drive plants are arranged outside the fuselage there is created an unfavorable air resistance because of the additional frontal area required resulting in the discarding of the acceleration drive plants immediately after initial acceleration is given to the aircraft. In addition, acceleration thrust plants arranged rearwardly of the continuous thrust plant, create undesirable disturbances in the latter's operation. It has been proposed to extend the continuous thrust plant through the starting drive plant, but this proposal has not met with success.

No attempt has heretofore been made to arrange the acceleration plant ahead of the continuous drive plant. The passage of the starting propulsion forces through the continuous drive plant appeared to be technically impossible.

An important object of the present invention is therefore to provide an operative arrangement with the acceleration thrust plant ahead of the continuous thrust plant.

Another object of the present invention is to provide means facilitating an offset arrangement of the acceleration nozzle or of a plurality of such nozzles relative to the fuselage, whereby the thrust passes adjacent the continuous thrust plant.

A further object of the present invention is to provide means permitting the arrangement of the acceleration thrust nozzle means in such a manner that the plane may ascend without further auxiliary starting equipment.

Still another object of the present invention is to provide means enabling the plane to ascend substantially without any preliminary run on the ground or runway.

These and other objects of the invention will become further apparent from the following detailed description, reference being made to the accompanying drawing showing preferred embodiments of the invention.

Figure 1:
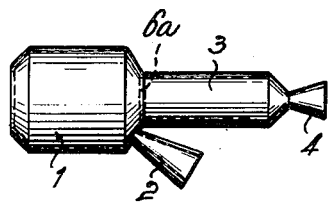
Fig. 1 is a sectional view of a combination of starting thrust and continuous drive plants embodying the invention.

Referring now to the drawing in detail, numeral 1 indicates the acceleration drive plant and 2 its thrust nozzle. The continuous thrust plant is shown at 3 and its thrust nozzle at 4. 5 shows schematically the fuselage, while 6 indicates the wall thereof.

The components of force forming the thrust are indicated by dotted lines 2a and 3a parallel to the axis of the assembly and transverse thereto respectively while the center of gravity is shown at 1a.

7 are the fins of the jet plane equipped with the aforesaid plants.

As a result of successfully conducted experiments it is possible to arrange these two plants 1 and 3 so that the acceleration thrust nozzle 2 may extend unimpededly past the continuous thrust plant 3 and the fuselage wall 6 as well as through the center of gravity 1a of the aircraft.

In operation, the acceleration thrust plant arranged according to the invention has the center of gravity of the plane located therewithin.

Such a disposition of the thrust nozzle of the acceleration thrust plant has the further advantage in that the plane may ascend without auxiliary starting equipment.

Figure 2:
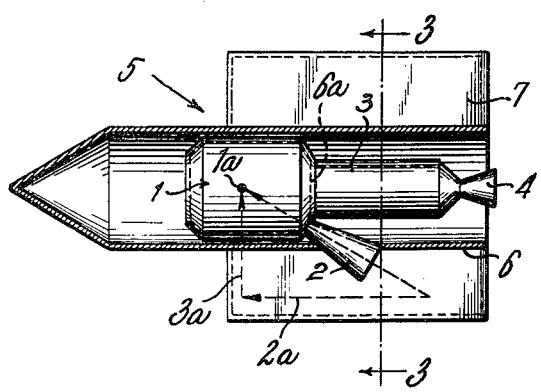
Fig. 2 illustrates schematically the arrangement of the plants of Fig. 1 in the plane's fuselage and Fig. 3 is a cross-section of Fig. 2 taken on lines 3—3 of Fig. 2.
Figure 3:
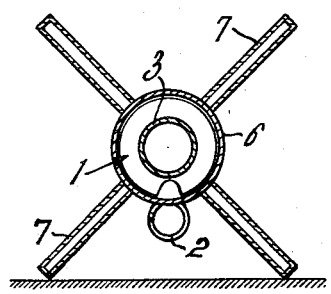

The acceleration thrust plant and its direction transfers to the plane in accordance with Fig. 2 not only an acceleration component 2a in the direction of the flight but contributes also to the lifting of the plane by means of vertical component 3a from the ground, without requiring a preliminary run on the ground. The thrust is the vector sum of components 2a and 3a. Thus it becomes possible to start the plane without special starting means and from substantially level ground. The angular offset or canted position of the nozzle may be at an angle of at least 20 degrees.

The thrust plant arranged according to the invention permits an arrangement of the acceleration drive plant having the center of gravity of the plane therewithin. The reduction in weight due to the consumption of the starting fuel does not effect any considerable change in the displacement of gravity which would otherwise be very disadvantageous, since the thrust duration is relatively short and the displacement of the center of gravity therefor occurs.

The arrangement of the thrust plant as illustrated may be employed as at 6a to form the rear wall of the acceleration plant integral and in common with the lower front wall of the continuous drive plant so that both may be firmly secured in the fuselage and a substantial reduction in weight because of the unitary construction may thus be attained.

Thus the acceleration plant 1 and the continuous drive plant 3 are disposed in tandem relation and have a wall 6a in common, from the lower end of which extends thrust nozzle 2. The axis of thrust nozzle 2 and the axis of the continuous drive plant converge towards the center of gravity and the thrust nozzle 2 is canted and angularly offset with respect to the axis of said continuous drive plant 3, an angle of at least 20° being formed between the axis of said thrust nozzle with the axis of said continuous drive plant to permit ascension of the aircraft without preliminary run on the ground.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An aircraft comprising a fuselage having a solid fuel rocket power acceleration plant and a solid fuel rocket power continuous drive plant for starting and continuously driving said aircraft in flight, said acceleration plant extending in tandem relation to and forwardly of said continuous drive plant, said acceleration plant including at least one thrust nozzle communicating with said acceleration plant and extending downwardly and rearwardly through said fuselage and at an acute angle to said continuous drive plant, said acceleration plant and said continuous drive plant being provided with a wall common to both said plants.

2. An aircraft comprising a fuselage having a solid fuel rocket power acceleration plant and a solid fuel rocket power continuous drive plant for starting and continuously driving said aircraft in flight, said acceleration plant extending in the direction of flight and being located ahead of said continuous drive plant, and at least one thrust nozzle forming part of said acceleration plant and arranged offset and angularly with respect to said continuous drive plant, said one thrust nozzle having its line of thrust force converging with the line of gravity force at the center of gravity of said aircraft, whereby the resultant force derived from both said thrust and gravity forces propels said aircraft upwardly without a preliminary horizontal run, said one thrust nozzle extending downwardly and rearwardly through said fuselage and at an acute angle of at least 20 degrees to said continuous drive plant, said acceleration plant and said continuous drive plant being provided with a wall common to both said plants.

References Cited in the file of this patent

UNITED STATES PATENTS

| | | |
|---|---|---|
| 2,503,271 | Hickman | Apr. 11, 1950 |
| 2,774,554 | Ashwood | Dec. 18, 1956 |

FOREIGN PATENTS

| | | |
|---|---|---|
| 530,577 | Canada | Sept. 18, 1956 |